United States Patent
Park et al.

(10) Patent No.: US 7,391,366 B2
(45) Date of Patent: Jun. 24, 2008

(54) HIGH SENSITIVITY GPS RECEIVER AND METHOD FOR COMPENSATING FOR DOPPLER VARIATION

(75) Inventors: Chan-Woo Park, Seoul (KR); Sun Choi, Seoul (KR)

(73) Assignee: Samsung Electronics Co., Ltd, Sunwon-Si (KR)

( * ) Notice: Subject to any disclaimer, the term of this patent is extended or adjusted under 35 U.S.C. 154(b) by 0 days.

(21) Appl. No.: 11/138,388

(22) Filed: May 27, 2005

(65) Prior Publication Data

US 2006/0012515 A1  Jan. 19, 2006

(30) Foreign Application Priority Data

Jul. 13, 2004  (KR)  .................. 10-2004-0054416

(51) Int. Cl.
  G01S 5/14   (2006.01)
  H04B 7/185  (2006.01)

(52) U.S. Cl. .................. 342/357.15; 342/357.09; 342/357.14

(58) Field of Classification Search ............ 342/357.15, 342/357.02, 357.09, 357.14, 357.05
See application file for complete search history.

(56) References Cited

U.S. PATENT DOCUMENTS

| | | | |
|---|---|---|---|
| 5,177,490 A * | 1/1993 | Ando et al. ............. | 342/357.15 |
| 5,703,597 A * | 12/1997 | Yu et al. ................ | 342/357.12 |
| 5,931,890 A * | 8/1999 | Suwa et al. ............. | 701/213 |
| 6,208,290 B1 * | 3/2001 | Krasner ................ | 342/357.05 |
| 6,240,367 B1 * | 5/2001 | Lin ..................... | 342/357.14 |
| 6,311,129 B1 * | 10/2001 | Lin ..................... | 701/214 |
| 6,397,146 B1 * | 5/2002 | Bruner ................. | 342/357.14 |
| 6,449,559 B2 * | 9/2002 | Lin ..................... | 342/357.14 |
| 6,532,251 B1 * | 3/2003 | King et al. ............. | 342/357.01 |
| 6,850,557 B1 * | 2/2005 | Gronemeyer ........... | 342/357.01 |
| 6,958,726 B1 * | 10/2005 | Abraham et al. ........ | 342/357.15 |
| 2002/0039381 A1 * | 4/2002 | Dooley et al. ........... | 375/147 |
| 2005/0162311 A1 * | 7/2005 | Dooley et al. .......... | 342/357.12 |
| 2006/0115022 A1 * | 6/2006 | Ziedan et al. .......... | 342/357.15 |

FOREIGN PATENT DOCUMENTS

WO  WO 2005/085895 A1 * 9/2005

* cited by examiner

Primary Examiner—Thomas H. Tarcza
Assistant Examiner—Fred H. Mull
(74) Attorney, Agent, or Firm—Roylance, Abrams, Berdo & Goodman, LLP

(57) ABSTRACT

A global positioning system (GPS) receiver and method are provided for compensating for Doppler variation to accurately detect GPS signals in an environment in which intensities of the GPS signals received from GPS satellites are very low. A user acceleration measuring unit measures an acceleration vector of the terminal with respect to a center of the Earth. A user Doppler variation rate estimator estimates a user Doppler variation rate of each GPS satellite due to acceleration of the terminal by making use of the measured acceleration vector. A Doppler predictor predicts a Doppler frequency according to the estimated user Doppler variation rate. Code and carrier frequency signal generators compensate codes and carriers of GPS satellites to be correlated with signals received therefrom by making use of the predicted Doppler frequency.

13 Claims, 5 Drawing Sheets

HIGH SENSITIVITY GPS RECEIVER AND METHOD FOR COMPENSATING FOR DOPPLER VARIATION

PRIORITY

This application claims the benefit under 35 U.S.C. 119(a) of an application entitled "HIGH SENSITIVITY GPS RECEIVER AND METHOD FOR COMPENSATING FOR DOPPLER VARIATION", filed in the Korean Intellectual Property Office on Jul. 13, 2004 and assigned Ser. No. 2004-54416, the entire contents of which are incorporated herein by reference.

BACKGROUND OF THE INVENTION

1. Field of the Invention

The present invention relates generally to a global positioning system (GPS). More particularly, the present invention relates to a GPS receiver and method for compensating for Doppler variation to accurately detect GPS signals in an environment in which intensities of the GPS signals received from GPS satellites are very low.

2. Description of the Related Art

With the development of technology, personal portable communication is rapidly developing, and various supplementary services are being supported. Some countries have enacted laws stating that mobile terminals must be equipped with a global positioning system (GPS) device. It is a trend that various location-based services are providing to many mobile terminals. Many GPS satellites broadcast ephemeris and system time information while orbiting the Earth, such that GPS receivers can determine their positions. The GPS receivers can accurately determine their positions by computing the arrival times of GPS signals simultaneously transmitted from at least four satellites.

This procedure requires several minutes to determine a user's position. More specifically, a compact GPS receiver with a limited amount of battery power cannot perform the above-mentioned procedure for a prolonged period. Accordingly, some GPS receivers receive, from an assisted GPS (AGPS) server, basic Doppler information, that is, coarse code phase values and coarse Doppler values, necessary for a search. Multiple satellites must be able to simultaneously observe a GPS receiver, and the GPS receiver must receive high-quality signals from the satellites. Because many portable or mobile devices may not be equipped with high-quality antennas, and/or may be located within forested areas and buildings, it is difficult for the portable devices to receive high-quality signals.

A conventional GPS does not use a pilot channel in which no data bit is modulated, but can remove a data bit by making use of a predicted data bit provided from the AGPS server. An improved coarse acquisition (C/A) code of a L2 band can use unmodulated data. Because unmodulated signals can be coherently integrated for a long time, it is very important that reception sensitivity be improved through coherent integration of GPS signals with weak signal intensities. Application of an accurate Doppler frequency is essential in the time-consuming coherent integration. More specifically, because a frequency error generated from a local oscillator (LO) or a Doppler offset due to user motion lowers a correlation energy value in time-consuming coherent integration, it makes signal acquisition difficult.

FIG. 1 is a block diagram illustrating a conventional GPS receiver 100 for detecting a GPS signal. The GPS receiver 100 has a relatively compact structure such that it can be mounted to a mobile phone, remote communication device, or portable device.

Referring to FIG. 1, an antenna 102 receives a radio frequency (RF) signal from a GPS satellite, and a signal receiver 104 converts the received RF signal into an intermediate frequency (IF) signal. The signal receiver 104 converts the IF signal into a digital signal and then outputs the digital signal to a mixer 108. The mixer 108 mixes a carrier frequency signal with the digital signal and then outputs a result of the mixing to a correlator 120.

A carrier numerically controlled oscillator (NCO) 114 and a code NCO 116 compensate for a carrier phase error and a code phase error according to relative position or speed variation, respectively. The GPS receiver 100 can further include an AGPS receiver (not illustrated) for receiving coarse Doppler information and other signal parameters from an AGPS server. The Doppler information and the parameters received from the AGPS server are provided to the carrier NCO 114, a code generator 118, and the code NCO 116.

The carrier NCO 114 generates a carrier frequency signal appropriate for a Doppler search using an oscillation signal provided from a temperature-compensated crystal oscillator (TCXO) 112, and then provides the carrier frequency signal to the mixer 108. The code NCO 116 associated with the GPS satellite generates a code frequency signal in which phase has been corrected at a carrier frequency. The code generator 118 generates a pseudo random noise (PRN) code of the GPS signal in response to the code frequency signal. The correlator 120 correlates a signal output from the mixer 108 with the PRN code to obtain a correlated sample. Correlated samples are accumulated for approximately 1 msec, and a result of the accumulation corresponds to a result of 1-msec coherent integration.

A Doppler frequency generated due to relative motion between the GPS satellite and the GPS receiver 100 influences peak values of the correlated samples. This influence is not completely removed by the carrier NCO 114. Accordingly, the GPS receiver 100 controls the carrier NCO 114 to perform a Doppler search. That is, the carrier NCO 114 outputs the carrier frequency signal while varying the carrier frequency by a predetermined frequency offset within a predetermined Doppler search range. The correlated samples based on carrier frequency signals are stored in a memory 122 such as a random access memory (RAM).

A coherent integrator 124 reads samples from the memory 122, accumulates the samples by the number of coherent integrations, and coherently integrates the accumulated samples. A signal detector 126 detects a correlated sample with peak energy greater than a predetermined detection threshold value from correlated samples output by the coherent integrator 124. A carrier frequency with the peak energy is regarded as a Doppler frequency.

In an indoor environment in which GPS signals with sufficiently strong intensities cannot be obtained from GPS satellites, a GPS receiver of a mobile terminal is notified of a search range of a code and a Doppler frequency to be searched for from an adjacent AGPS server to improve reception sensitivity, and effectively detects low-level signals by increasing a coherent integration time using the Doppler frequency search range.

However, there are limitations to increasing the coherent integration time to improve the reception sensitivity. First, there is a problem in that correlation effect is reduced by a polarity of a navigation data bit in a GPS signal when time-consuming coherent integration is performed because the GPS signal, which is different from a code division multiple access (CDMA) signal, does not have a pilot channel. Second, there is another problem in that a signal-to-noise ratio (SNR) is reduced when time-consuming coherent integration is performed in a state in which Doppler frequency variation is not compensated for.

To address the first problem, the AGPS server sends in advance predicted message bits to a terminal through a separate network. A position of a data bit boundary of a 20-msec cycle can be synchronized by making use of a system time of a CDMA network with an accuracy of approximately several micro seconds (μsec).

The second problem can be addressed by predicting Doppler variation. Doppler variation is caused by the following three factors:

I) GPS satellite motion and the rotation of the Earth vary a Doppler frequency of a GPS signal according to time. Conventionally, the Doppler frequency has a variation rate in the range of 0.5 to 1 Hz per second.

II) A signal used in the terminal is generated according to a user's local clock, and the instability of the local clock varies a GPS signal.

III) The last factor is user motion. According to the user motion, the Doppler frequency has a variation rate in the range of 1 to 10 Hz per second. It is impossible for the user motion to be predicted. The user motion may significantly affect the Doppler frequency for a coherent integration time of less than 1 second, and may basically limit reception sensitivity.

SUMMARY OF THE INVENTION

Accordingly, the present invention has been designed to solve the above and other problems occurring in the prior art. Therefore, it is an aspect of the present invention to provide a global positioning system (GPS) receiver and method that can compensate for Doppler variation degrading reception sensitivity by making use of an inertial sensor.

It is another aspect of the present invention to provide a global positioning system (GPS) receiver and method that can measure Doppler variation between a user and each satellite by computing acceleration and an acceleration vector of a user terminal in an Earth Centered Earth Fixed (ECEF) system used by a GPS satellite through an inertial sensor.

It is yet another aspect of the present invention to provide a global positioning system (GPS) receiver and method that can improve reception sensitivity of a GPS signal in a metropolitan area and/or an indoor area by compensating for Doppler variation measured by an inertial sensor.

The above and other aspects of the present invention can be achieved by a method for compensating for Doppler variation due to user motion in a global positioning system (GPS) receiver mounted to a user terminal, comprising measuring an acceleration vector of the terminal with respect to a center of the Earth, estimating a user Doppler variation rate of each GPS satellite due to acceleration of the terminal by making use of the measured acceleration vector, predicting a Doppler frequency according to the estimated user Doppler variation rate, and compensating codes and carriers of GPS satellites to be correlated with signals received therefrom by making use of the predicted Doppler frequency.

The above and other aspects of the present invention can be achieved by a global positioning system (GPS) receiver mounted to a user terminal for compensating for Doppler variation due to user motion, comprising a user acceleration measuring unit for measuring an acceleration vector of the terminal with respect to a center of the Earth, a user Doppler variation rate estimator for estimating a user Doppler variation rate of each GPS satellite due to acceleration of the terminal by making use of the measured acceleration vector, a Doppler predictor for predicting a Doppler frequency according to the estimated user Doppler variation rate, and code and carrier frequency signal generators for compensating codes and carriers of GPS satellites to be correlated with signals received therefrom by making use of the predicted Doppler frequency.

BRIEF DESCRIPTION OF THE DRAWINGS

The above and other aspects and advantages of the present invention will be more clearly understood from the following detailed description taken in conjunction with the accompanying drawings, in which.

Throughout the drawings, the same element is designated by the same reference numeral or character.

DETAILED DESCRIPTION OF EXEMPLARY EMBODIMENTS

Embodiments of the present invention will be described in detail herein below with reference to the accompanying drawings. In the following description, a detailed description of known functions and configurations incorporated herein will be omitted for conciseness. It is to be understood that the phraseology and terminology used herein are for the purpose of description and should not be regarded as limiting.

The embodiments of the present invention improve reception sensitivity by compensating low-level global positioning system (GPS) signals for Doppler variation. That is, it is preferred that a GPS receiver performs time-consuming coherent integration in the range of 100 msec to 1000 msec to detect the GPS signal with a very low signal to noise ratio (SNR) in a metropolitan area or an indoor area. For this, the Doppler variation must be compensated for during a coherent integration period. The GPS receiver receives bit information of a GPS signal message through a message received from an assisted GPS (AGPS) server, and compensates for the Doppler variation due to satellite motion and the rotation of the Earth through a satellite ephemeris. Moreover, the GPS receiver compensates for the Doppler variation due to user motion in accordance with an embodiment of the present invention.

When performing time-consuming coherent integration to acquire and track a GPS signal with a very low SNR, an embodiment of the present invention detects and compensates for Doppler frequency variation as an obstacle. The user motion is one of the factors causing the Doppler frequency variation and is very difficult to predict. More specifically, this embodiment of the present invention applies information on the user motion to coherent integration after detecting the user motion using an inertial sensor. Accordingly, this embodiment of the present invention can perform coherent integration for more than 1000 msec and can improve GPS reception sensitivity in an area in which a SNR is low.

The GPS receiver must correlate GPS signals in real time. When a portable or mobile device with limited hardware resources performs a complex computation for determining a carrier and code of a GPS signal, the complex computation places a heavy burden on the processor and the power supply, and requires a relatively long period of time to complete. Conventional GPS receivers such as portable or mobile devices receive coarse parameters necessary to search for GPS signals from an adjacent server equipped with a GPS receiver using a separate data communication function. This system is referred to as the assisted GPS (AGPS), and the server is referred to as the AGPS server.

Figure 1:
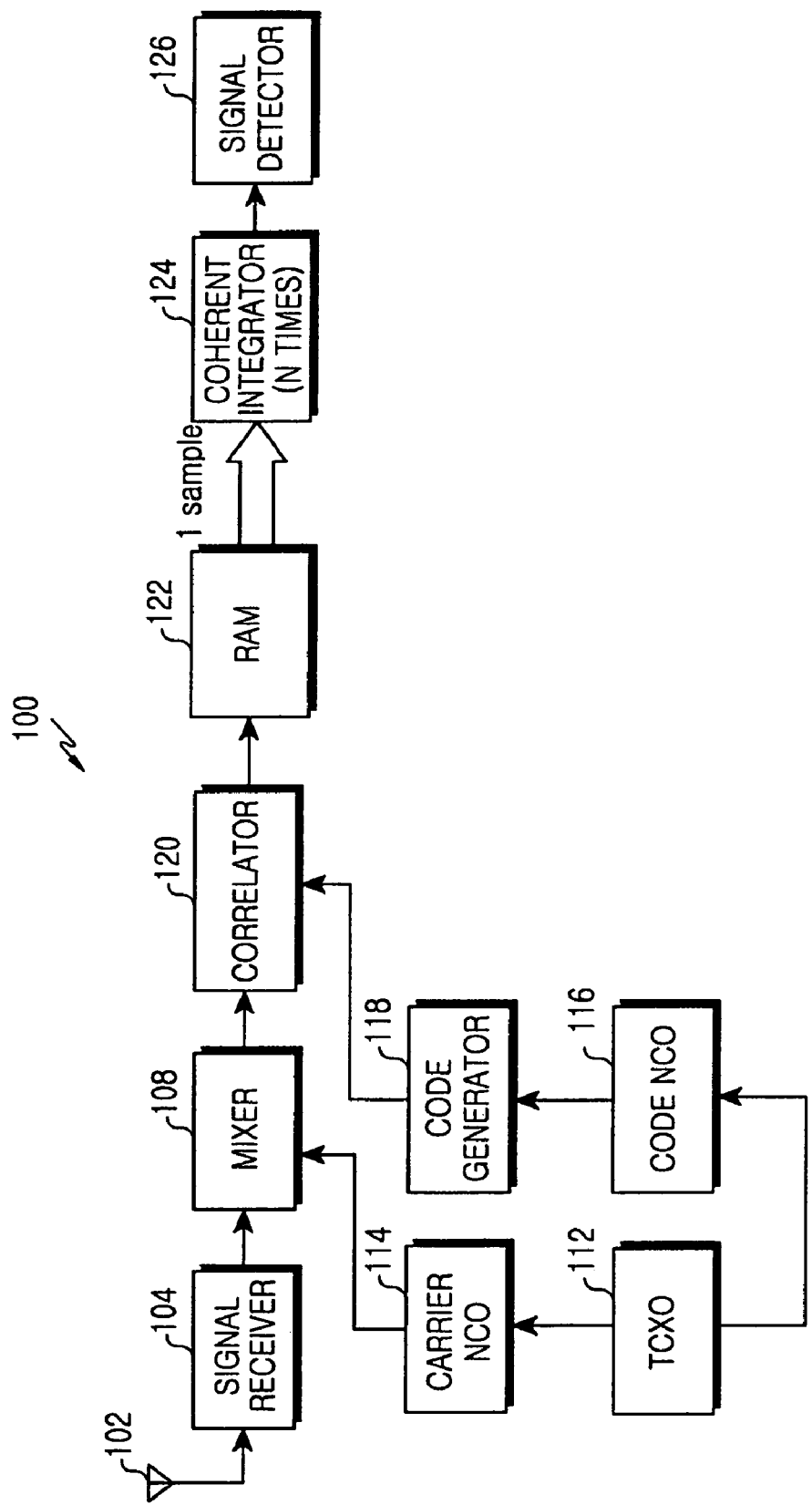
FIG. 1 is a block diagram illustrating a conventional global positioning system (GPS) receiver for detecting a GPS signal.
Figure 2:
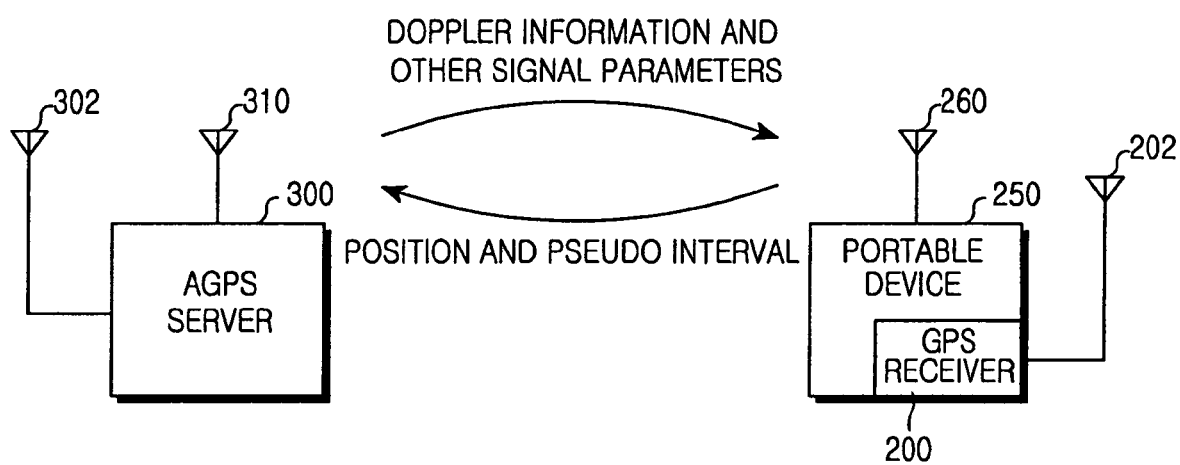
FIG. 2 illustrates a GPS receiver with a communication link in accordance with an embodiment of the present invention.

FIG. 2 illustrates a GPS receiver with a communication link in accordance with an embodiment of the present invention. The GPS receiver provided in a portable or mobile device 250 has a system structure for receiving parameters necessary to search for a GPS signal from an AGPS server 300.

Referring to FIG. 2, the portable terminal 250 communicates with the AGPS server 300 in accordance with an embodiment of the present invention. The AGPS server 300 is located adjacent to the portable terminal 250, and is associated with the same GPS satellites as those used by the portable terminal 250. Accordingly, the AGPS server 300 receives GPS signals from the GPS satellites through a GPS antenna 302, roughly determines Doppler information and other signal parameters of the GPS satellites on the basis of the GPS signals, includes a result of the determination in an AGPS message, and outputs the AGPS message to the portable terminal 250 through an antenna 310.

The portable terminal 250 receives the AGPS message through an antenna 260. A GPS receiver 200 provided in the portable terminal 250 searches for the GPS signals received through a GPS antenna 202 within a code and carrier search range roughly determined according to the Doppler information included in the AGPS message, etc.

Figure 3:
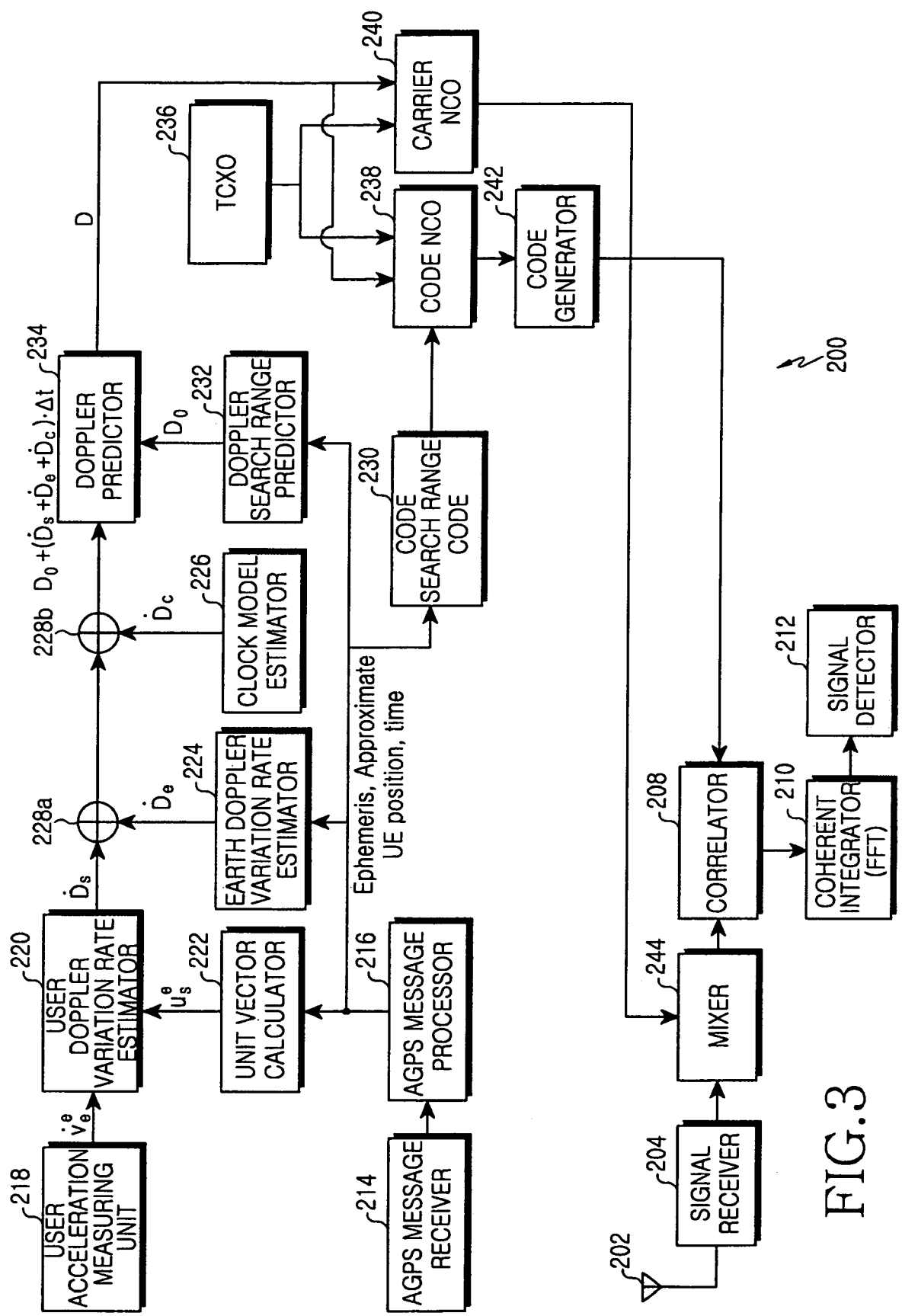
FIG. 3 is a detailed block diagram illustrating the GPS receiver for compensating for Doppler variation in accordance with an embodiment of the present invention.

FIG. 3 is a block diagram illustrating details of the GPS receiver 200 in accordance with an embodiment of the present invention.

Referring to FIG. 3, an AGPS message receiver 214 receives an AGPS message including Doppler information from an AGPS server, and an AGPS message processor 216 analyzes the AGPS message to obtain the Doppler information such as ephemeris data of GPS satellites capable of being observed, an approximate position of the portable terminal 250 or user equipment (UE), an international time, and so on. The obtained Doppler information is provided to a unit vector calculator 222, an Earth Doppler variation rate estimator 224, a Doppler search range predictor 232, and a code search range predictor 230. The code search range predictor 230 predicts a code search range including pseudo random noise (PRN) codes of the GPS satellites from the Doppler information.

A user acceleration measuring unit 218 measures acceleration, rotation, and direction according to inertia of the portable terminal 250, and measures an acceleration vector $v_e^e$ of the portable terminal 250 in an Earth Centered Earth Fixed (ECEF) coordinate system. The unit vector calculator 222 calculates a unit vector $\mu_s^e$ from the portable terminal to each satellite, using ephemeris data of the GPS satellites and approximate position data of the portable terminal 250. A user Doppler variation rate estimator 220 estimates a Doppler variation rate $D_s$ (Hz/sec) of each satellite due to the acceleration of the portable terminal by making use of the acceleration and the unit vector. The Earth Doppler variation rate estimator 224 estimates a Doppler variation rate $D_e$ due to the rotation of the Earth by making use of the ephemeris data of the satellites. A clock model estimator 226 estimates a frequency variation rate $D_c$ due to the instability of a local clock according to a clock model of a temperature-compensated crystal oscillator (TCXO) 236. Adders 228a and 228b sum the estimated rates, such that the sum of the estimated rates is provided to a Doppler predictor 234.

The Doppler search range predictor 232 predicts a Doppler search range and a center frequency of the Doppler search range (hereinafter, referred to as the Doppler center) according to a rough variation rate of a Doppler frequency based on the Doppler information provided from the AGPS message processor 216. The Doppler predictor 234 predicts a present Doppler frequency by summing Doppler variation rate values and a value of the Doppler center for a unit time. The predicted Doppler frequency is provided to a code numerically controlled oscillator (NCO) 238 and a carrier NCO 240.

The carrier NCO 240 and the code NCO 238 compensate for a carrier phase error and a code phase error according to relative position or speed variation of the GPS receiver 200. That is, the carrier NCO 240 generates a carrier frequency signal appropriate for a Doppler search using an oscillation signal provided from the TCXO 236 according to the predicted Doppler frequency provided from the Doppler predictor 234. The code NCO 238 generates a code frequency signal in which phase has been compensated for according to the carrier frequency signal in the code search range provided from the code search range predictor 230. A code generator 242 generates a pseudo random noise (PRN) code of a GPS signal according to the code frequency signal. The carrier frequency signal is provided to a mixer 244 for frequency conversion of a received signal. That is, the carrier NCO 240 outputs the carrier frequency signal while varying the carrier frequency by a predetermined frequency offset within the predicted Doppler search range of the Doppler search range predictor 232.

A signal receiver 204 receives a radio frequency (RF) signal output from the GPS satellite by means of an antenna 202. The mixer 244 performs the frequency conversion by mixing the signal received from the signal receiver 204 with the carrier frequency signal generated from the carrier NCO 240. A correlator 208 correlates a result of the mixing with the PRN code generated from the code generator 242 to obtain a correlated sample. The correlator 208 repeatedly performs a correlation operation on a plurality of carrier frequency signals generated from the carrier NCO 240 and produces correlated samples.

A coherent integrator 210 coherently integrates the correlated samples based on the carrier frequency signals generated from the carrier NCO 240. The coherent integrator 210 uses fast Fourier transform (FFT) to efficiently detect a low level signal. The coherent integrator 210 reads the samples and accumulates and coherently integrates the read samples by the necessary number of coherent integrations. A signal detector 212 repeatedly searches for correlation energies of the accumulated samples output from the coherent integrator 210, and detects a correlated sample with peak energy greater than a predetermined detection threshold. A carrier frequency with the peak energy is regarded as a Doppler frequency.

The user Doppler variation rate estimator 220 measures a Doppler variation rate of each satellite using the terminal's acceleration and the unit vector in the direction to each satellite. An internal structure of the user acceleration measuring unit 218 for detecting terminal motion will be described with reference to FIG. 6.

The Earth Doppler variation rate estimator 224 and the clock model estimator 226 are used to estimate the Doppler variation rate due to a different factor. The Doppler predictor 234 predicts the present Doppler frequency on the basis of Doppler variation rates estimated by the user Doppler variation rate estimator 220, the Earth Doppler variation rate estimator 224 and the clock model estimator 226 and the Doppler center predicted by the Doppler search range predictor 232. The predicted Doppler frequency is applied to the correlator 208 and the coherent integrator 210 through the code NCO 238 and the carrier NCO 240. The Doppler predictor 234 continuously updates and predicts the present Doppler frequency while the coherent integrator 210 performs coherent integration.

The result of coherent integration according to a Doppler variation rate when time-consuming coherent integration is performed will be described. A relation between the Doppler variation rate and the correlation energy is defined in Equation 1:

$$I = AR(\tau) \int_{-T/2}^{T/2} \cos(\partial\omega T + \partial\theta) dt + n \quad (1)$$
$$= AT \cdot R(\tau) \frac{\sin(\partial\omega T/2)}{\partial\omega T/2} \cos(\partial\theta) + n$$

In Equation 1, I is the magnitude of correlation energy, A is the amplitude of correlation energy according to a signal-to-noise ratio (SNR), and n is correlation noise. In Equation 1, $R(\tau)$ is a correlation function associated with a code phase error of $\tau$ chips, $\partial\omega$ is $2\pi\partial f$ where $\partial f$ is a frequency error (Hz), T is a coherent integration period (seconds), and $\partial\theta$ is a phase error (radians). In Equation 1, $\partial\omega/\omega T$ is $2\pi\partial f/\partial t$, and $\partial f/\partial t$ is the frequency error rate.

Figure 4:
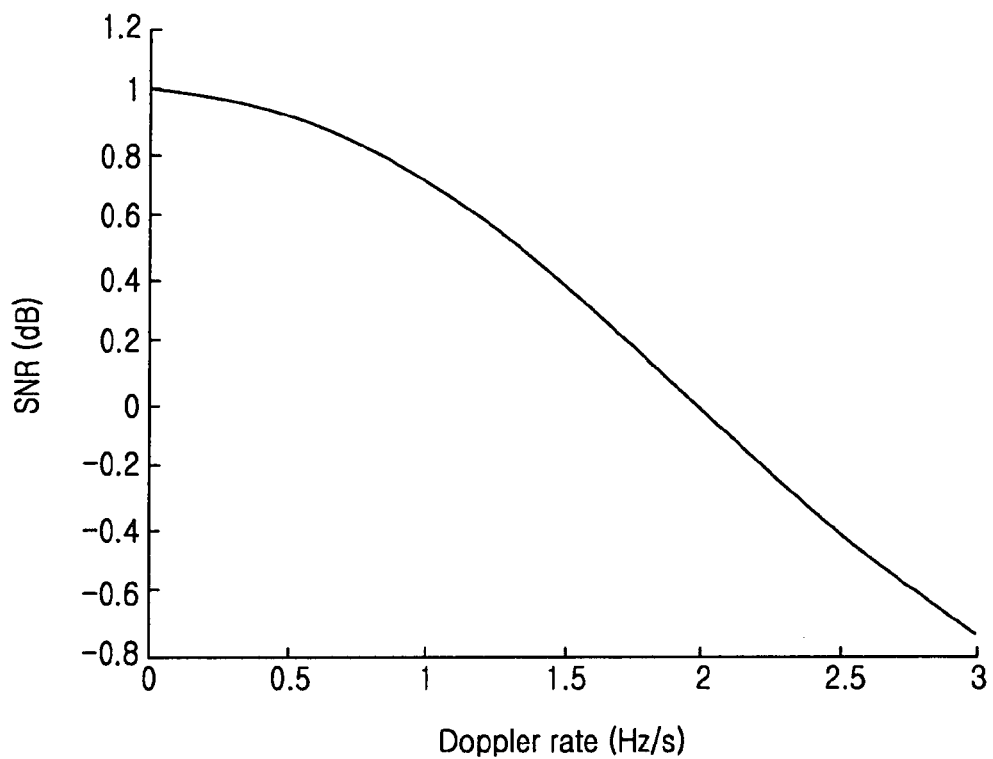
FIG. 4 is a graph illustrating a signal-to-noise ratio (SNR) according to a Doppler rate when frequency error variation is linear.

An SNR according to a Doppler variation rate when frequency error variation is linear in Equation 1 is illustrated in FIG. 4. FIG. 4 illustrates an SNR varying with a Doppler rate in the range of 0~3 Hz/sec when the frequency error varies in the range of 200-800 Hz during the coherent integration period of 1 second. As illustrated in FIG. 4, the coherent integration effect is lost when the Doppler rate is greater than 2 Hz/sec in the coherent integration period of 1 second. That is, when the coherent integration is performed for more than 1 second, it can be seen that the coherent integration effect is lost at a low Doppler rate of 2 Hz/sec.

The user acceleration measuring unit 218 of FIG. 3 expresses an acceleration vector of the terminal based on the user motion as one of the Doppler variation factors in an ECEF coordinate system capable of defining the satellite motion. That is, when a signal received from Satellite S has Doppler variation due to the acceleration of the terminal, a Doppler variation rate $D_s$ is computed by the dot product of the acceleration vector $v_e^e$ of the terminal and the unit vector $\mu_s^e$ in the direction from the terminal to Satellite S in Equation 2:

$$D_s = \mu_s^e \cdot v_e^e \quad (2)$$

In Equation 2, $v_e^e$ denotes an acceleration vector of the terminal in the ECEF frame.

Figure 5:
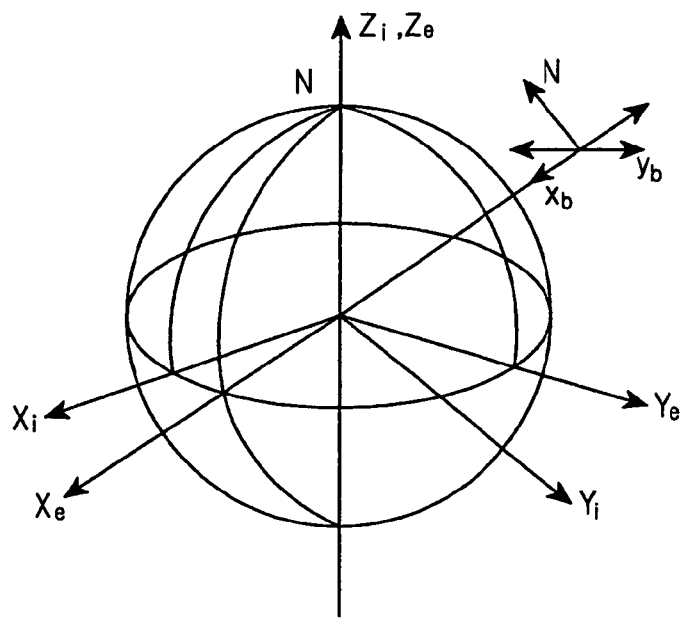
FIG. 5 illustrates an Earth Centered Earth Fixed (ECEF) coordinate frame in accordance with an embodiment of the present invention.

FIG. 5 illustrates an ECEF coordinate frame in accordance with an embodiment of the present invention. This embodiment of the present invention takes into account an ECEF frame (e-frame) and a body frame (b-frame). An inertial frame (i-frame) is considered when acceleration is computed. The coordinate origins of the ECEF frame and the inertial frame are the center of the Earth, and the center of the body frame is the terminal itself.

The ECEF frame is a coordinate system whose origin is located at the center of the Earth. The x-axis is the Greenwich meridian in the equatorial plane, and the z-axis is the rotational axis of the Earth. The satellite motion is computed in the ECEF frame. To measure a Doppler frequency and a Doppler rate between the terminal and the satellite, a position, velocity and acceleration of the present terminal are computed in the ECEF coordinate system.

The body frame is a coordinate system fixed to the terminal, and is used by a gyroscope or accelerometer. The inertial frame, which is different from the ECEF frame, is a coordinate system fixed to the universe. In the inertial frame, the x-axis is directed to the vernal equinox, and the z-axis is the rotational axis of the Earth. The rotational speed of the Earth can be computed using the inertial frame.

Figure 6:
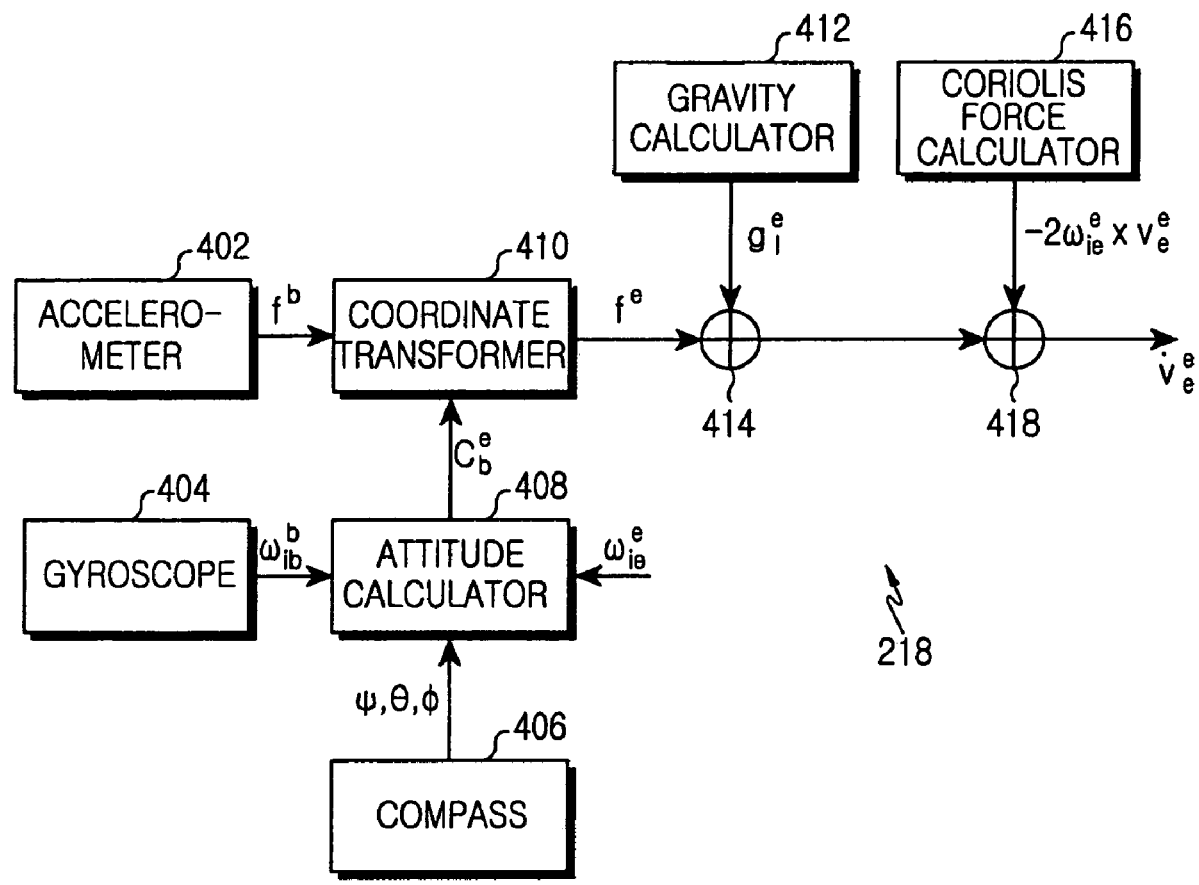
FIG. 6 is a block diagram illustrating a user acceleration measuring unit for detecting user motion in accordance with an embodiment of the present invention.

Details of the user acceleration measuring unit 218 of FIG. 3 based on the above-mentioned frames will be described with reference to FIG. 6. As illustrated in FIG. 6, the user acceleration measuring unit 218 includes an accelerometer 402, a gyroscope 404, a compass 406, an attitude calculator 408, a coordinate transformer 410, a gravity calculator 412, a Coriolis force calculator 416, and compensators 414 and 418. A process for predicting a Doppler variation rate associated with the terminal in accordance with an embodiment of the present invention will be described in detail with reference to FIG. 6.

An acceleration vector of the terminal in the ECEF frame serving as a rotation coordinate system fixed to the Earth rather than the acceleration of the terminal in the inertia frame must be computed such that the Doppler variation rate due to motion of the terminal can be computed. The coordinate transformer 410 transforms an acceleration vector, directly measured by the accelerometer 402, from the body frame into the ECEF frame while taking into account the rotation speed of the Earth and the gravitational field of the Earth, thereby obtaining the acceleration vector with respect to the ECEF frame.

A velocity vector $v_e$ of the ECEF frame is expressed as Equation 3:

$$v_e = \frac{d}{dt}r\Big|_e = \frac{d}{dt}r\Big|_i - \omega_{ie} \times r \quad (3)$$

In Equation 3, r is a position vector of the terminal, $\omega_{ie}$ is an angular velocity vector of the Earth's rotation, and $$\frac{d}{dt}$$

is the derivative with respect to time.

A velocity variation rate of the terminal in the ECEF coordinate system can be computed from the acceleration vector in the inertial frame by Equation 4 based on the following Coriolis equation:

$$\frac{d}{dt}v_e\bigg|_e = \frac{d}{dt}v_e\bigg|_i - \omega_{ie} \times v_e \qquad (4)$$

A variation rate of $v_e$ in the inertial coordinate system is obtained by re-differentiating Equation 3 with respect to the inertial coordinate system. The re-differentiated Equation 3 is Equation 5:

$$\frac{d}{dt}v_e\bigg|_i = f - \omega_{ie} \times v_e + g_l \qquad (5)$$

In Equation 5, $f$ is acceleration of the terminal due to external force, and $g_l$ is a local gravity vector due to the centrifugal force of the Earth's rotation and the Earth's gravitational field. The acceleration of the terminal in the inertial frame is expressed by Equation 6:

$$\frac{d^2}{dt^2}r\bigg|_i = f + g = f + g_l + \omega_{ie} \times [\omega_{ie} \times r] \qquad (6)$$

When Equation 5 is plugged into Equation 4, the acceleration of the terminal in the ECEF frame is re-written as Equation 7:

$$\frac{d}{dt}v_e\bigg|_e = f - 2\omega_{ie} \times v_e + g_l \qquad (7)$$

When Equation 7 is expressed in the ECEF coordinate system, Equation 8 is obtained as follows:

$$v_e^e = C_b^e f^b - 2\omega_{ie}^e \times v_e^e + g_l^e \qquad (8)$$

In Equation 8, superscripts e and b indicate whether a coordinate system of corresponding vectors is the ECEF frame or the body frame. $f^b$ is based on the body frame, and is measured by the accelerometer 402 mounted in the terminal.

In Equation 8, $C_b^e$ denotes a direction cosine matrix for transforming the measured acceleration vector from the body frame into the ECEF frame. The attitude calculator 408 updates the transformation matrix using initial attitude values, an angular velocity vector $\omega_{ie}^b$ of the terminal's rotation measured by the gyroscope 404, an angular velocity vector $\omega^{ie}$ obtained by transforming angular velocity data of the Earth from the inertial frame into the ECEF frame. In this case, the initial attitude values are roughly measured by the compass 406 or a tilt sensor (not illustrated). If $f^b$ b is computed with respect to the ECEF frame, the compensator 414 compensates $f^b$ for a gravity vector $g_l^e$ computed by the gravity calculator 412, and the compensator 418 compensates output of the compensator 414 for a Coriolis force vector $-2\omega_{ie}^e \times v_e^e$, such that the acceleration vector $v_e^e$ of the terminal is obtained.

The user Doppler variation rate estimator 220 of FIG. 3 estimate a Doppler variation rate associated with each satellite due to the acceleration of the terminal by making use of the acceleration vector output from the user acceleration measuring unit 218. The adders 228a and 228b sum estimated Doppler variation rates associated with each satellite due to the user motion and Doppler variation rates due to other factors such that the Doppler predictor 234 can predict a present Doppler frequency.

As apparent from the above description, the embodiment of the present invention has a number of effects.

For example, an embodiment of the present invention can perform time-consuming coherent integration to acquire and track a GPS signal in which a SNR is very low in a metropolitan or indoor area. Moreover, the embodiment of the present invention can efficiently perform time-consuming coherent integration and significantly improve GPS reception sensitivity by measuring and compensating for Doppler variation due to user motion that is very difficult to predict among factors causing Doppler frequency variation capable of limiting the time-consuming coherent integration, using an inertial sensor.

Although certain embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. A method for compensating for Doppler variation due to user motion in a global positioning system (GPS) receiver mounted to a user terminal, comprising:

measuring an acceleration vector of the terminal in accordance with a center of the Earth;

estimating a user Doppler variation rate of GPS satellites due to acceleration of the terminal in accordance with the measured acceleration vector;

predicting a Doppler frequency according to the estimated user Doppler variation rate and at least one different estimated Doppler variation rate; and compensating a code frequency signal and a carrier frequency signal for use in receiving signals from GPS satellites in accordance with the predicted Doppler frequency.

2. The method according to claim 1, wherein estimating the user Doppler variation rate comprises:

computing a unit vector from the terminal to each GPS satellite in accordance with Doppler information received from an adjacent assisted GPS (AGPS) server; and estimating the user Doppler variation rate by computing a dot product of the acceleration vector and the unit vector.

3. The method according to claim 1, wherein predicting the Doppler frequency comprises:

estimating an Earth Doppler variation rate due to satellite motion and the Earth's rotation in accordance with Doppler information received from an adjacent assisted GPS (AGPS) server, and estimating a frequency variation rate due to instability of a local clock of the terminal; and predicting the Doppler frequency according to a sum value obtained by summing the user Doppler variation rate, the Earth Doppler variation rate, and the frequency variation rate.

4. The method according to claim 3, wherein predicting the Doppler frequency comprises:

predicting a Doppler search range roughly indicating variation of the Doppler frequency and a Doppler center of the Doppler search range in accordance with the Doppler information; and predicting the Doppler frequency by adding a value of the predicted Doppler center to the sum value for a unit time.

5. The method according to claim 1, wherein measuring the acceleration vector comprises:

measuring an acceleration vector of the terminal in accordance with a center of the terminal, and transforming the measured acceleration vector into an Earth Centered Earth Fixed (ECEF) frame to compute an acceleration vector due to external force to be applied to the terminal; and measuring the acceleration vector of the terminal in accordance with the center of the Earth by compensating the acceleration vector for gravity and Coriolis force.

6. The method according to claim 5, wherein measuring the acceleration vector further comprises:

measuring initial attitude values of the terminal;

measuring a rotation vector in accordance with the center of the terminal;

computing a direction cosine matrix for transforming the acceleration vector based on the center of the terminal into the ECEF frame in accordance with the initial attitude values, the rotation vector, and an angular velocity vector of the Earth's rotation; and applying the angular velocity vector based on the center of the terminal to the direction cosine matrix to compute the acceleration vector of the terminal in accordance with the center of the Earth.

7. A global positioning system (GPS) receiver mounted to a user terminal for compensating for Doppler variation due to user motion comprising:

a user acceleration measuring unit for measuring an acceleration vector of the terminal in accordance with a center of the Earth;

a user Doppler variation rate estimator for estimating a user Doppler variation rate of GPS satellites due to acceleration of the terminal in accordance with the measured acceleration vector;

a Doppler predictor for predicting a Doppler frequency according to the estimated user Doppler variation rate and at least one different estimated Doppler variation rate; and code and carrier frequency signal generators for compensating a code frequency signal and a carrier frequency signal for use in receiving signals from GPS satellites in accordance with the predicted Doppler frequency.

8. The GPS receiver according to claim 7, wherein the user Doppler variation rate estimator is connected to a unit vector calculator for computing a unit vector from the terminal to the GPS satellites in accordance with Doppler information received from an adjacent assisted GPS (AGPS) server, and wherein the user Doppler variation rate estimator computes a dot product of the acceleration vector and the unit vector to estimate the user Doppler variation rate.

9. The GPS receiver according to claim 7, further comprising:

an Earth Doppler variation rate estimator for estimating an Earth Doppler variation rate due to satellite motion and the Earth's rotation in accordance with Doppler information received from an adjacent assisted GPS (AGPS) server;

a clock model estimator for estimating a frequency variation rate due to instability of a local clock of the terminal; and adders for computing a sum value of the user Doppler variation rate, the Earth Doppler variation rate, and the frequency variation rate, and providing the sum value to the Doppler predictor.

10. The GPS receiver according to claim 9, wherein the Doppler predictor is connected to a Doppler search range predictor for predicting a Doppler search range indicating variation of the Doppler frequency and a Doppler center of the Doppler search range in accordance with the Doppler information, and wherein the Doppler predictor predicts the Doppler frequency by adding a value of the predicted Doppler center to the sum value for a unit time.

11. The GPS receiver according to claim 7, wherein the user acceleration measuring unit comprises:

an accelerometer for measuring an acceleration vector of the terminal in accordance with a center of the terminal;

a coordinate transformer for transforming the measured acceleration vector into an Earth Centered Earth Fixed (ECEF) frame to compute an acceleration vector due to external force applied to the terminal; and compensators for compensating the acceleration vector for gravity and Coriolis force to obtain the acceleration vector of the terminal in accordance with the center of the Earth.

12. The GPS receiver according to claim 11, wherein the coordinate transformer is connected to:

a compass for measuring initial attitude values of the terminal, a gyroscope for measuring a rotation vector in accordance with the center of the terminal, and an attitude calculator for computing a direction cosine matrix for transforming the acceleration vector based on the center of the terminal into the ECEF frame in accordance with the initial attitude values, the rotation vector, and an angular velocity vector of the Earth's rotation, and wherein the coordinate transformer applies an angular velocity vector based on the center of the terminal to the direction cosine matrix to compute the acceleration vector of the terminal in accordance with the center of the Earth.

13. The GPS receiver according to claim 7, further comprising:

a code generator for generating codes of the GPS satellites according to code frequency signals from the code frequency signal generator;

a mixer for mixing the signals received from the GPS satellites with carrier frequency signals;

a correlator for correlating output signals of the mixer with the codes to obtain correlated samples;

a coherent integrator for coherently integrating the correlated samples; and a signal detector for detecting desired GPS signals from output of the coherent integrator.

* * * * *